Patented Nov. 7, 1950

2,529,061

UNITED STATES PATENT OFFICE 2,529,061

PROCESS FOR THE MANUFACTURE OF BUTANEDIOL AND BUTANONE

Paul Vergnaud, Melle, France, assignor to Les Usines de Melle (Societe Anonyme), Saint-Leger-les-Melle, France, a corporation of France No Drawing. Application August 6, 1946, Serial No. 688,683. In France August 20, 1945

7 Claims. (Cl. 195—43)

This invention relates to a process for the manufacture of hydroxy butane compounds and especially 2,3-butanediol and 3-hydroxy-2-butanone.

2,3-butanediol, having a formula

CH$_3$.CH.OH.CH.OH.CH$_3$ is a product of great industrial importance. The levorotatory isomer is already known as having, in aqueous solution, very powerful anti-freeze properties, and may advantageously replace the anti-freeze products used at the present time. However, it owes its importance, above all, to the possibility of serving as an intermediary product for the manufacture of butadiene and of synthetic rubber. It is known, as a matter of fact, that certain diesters of this glycol are capable of decomposing with the greatest of ease under the action of heat, releasing butadiene and regenerating the acid which esterified the glycol. Finally, by dehydration, the 2,3-butanediol may supply methyl ethyl ketone, which is a solvent and an excellent fuel; likewise 3-hydroxy-2-butanone can generate methyl vinyl ketone, which is a raw material for the manufacture of synthetic resins.

It has been heretofore known how to manufacture 2,3-butanediol through fermentation, starting with very diverse sources of glucides. The organisms heretofore recommended are anaerobic or where usable under aerobic conditions, are unsatisfactory. As producers of 2,3-butanediol, they include especially *Aerobacillus polymyxa*, *Aeromonas hydrophila*, and *Aerobacter aerogenes*. Mention has also heretofore been made of the use of the *Aerobacter pectinoverum* to produce very high yields of diol under anaerobic conditions, but the fermentation requires a very long time. The *Aerobacillus polymyxa* (*Clostridium polymyxa*) is the only one which produces optically active 2,3-butanediol endowed with anti-freeze properties; however, it does not act in a suitable manner on molasses and prefers wheat.

All these organisms, furthermore, cause complex fermentations and there is always found, in addition to 2,3-butanediol and 3-hydroxy-2-butanone, an entire series of accessory products, the proportions of which remain comparatively large although they vary with the organisms used.

For example, in addition to 2,3-butanediol and 3-hydroxy-2-butanone (acetylmethylcarbinol) having the formula

.CH$_3$.CO.CHOH.CH$_3$ there are found acetic, lactic and succinic acids and ethyl alcohol. The quantity of ethyl alcohol may be predominant and extend to 16 to 40% of the fermented sugar, to the detriment, of course, of the yield in the products sought.

This is due to the fact that the organisms used are of the strict anaerobic type or of the optional anaerobic type and it was found that the contact with air of these organisms, while favoring the formation of diol with respect to ethyl alcohol, however reduces the speed of fermentation.

The principal object of the invention accordingly is to provide a simple efficient process for fermenting sugar-containing or amylaceous materials for the production of hydroxy butane compounds to secure an improved yield of such compounds.

The invention accordingly consists of the novel processes and steps of processes, specific embodiments of which are described hereinafter by way of example and in accordance with which I now prefer to practice the invention.

I have found, in accordance with my invention, that these various drawbacks can be avoided and that contrary to the known processes, the fermentation can be directed toward the exclusive formation of 2,3-butanediol or 3-hydroxy-2-butanone if the process is strictly an aerobic one, employing suitable organisms.

I have found in accordance with my invention that sugar-containing or amylaceous material may be fermented with a Mesentericus organism under aerobic conditions to produce a mixture of 2,3-butanediol and 3-hydroxy-2-butanone. These materials may be recovered by evaporation or otherwise as set forth below.

Thus, I have discovered that certain bacteria of the Mesenteric group have the property of causing rapid and easy fermentation of the sugar solutions which contain up to 8 to 10% sucrose. Contrary to the organisms used in the processes known, the bacteria herein described are strict aerobes and furnish a positive test for the Gram's stain reaction. They include the following: *Mesentericus vulgatus*; *Mesentericus ruber*; *Mesentericus fuscus*.

The raw materials which the Mesentericus is capable of utilizing are very diversified. They are, in general, all those which can serve for the manufacture of alcohol. The worts may be prepared with sugar-containing and amylaceous materials, preferably in concentrated form; special mention must be made of molasses, which constitutes a material which is easier to use and much less costly than grain worts. Amylaceous materials are preferably saccharified before the fermentation.

It is indispensable to effect a sufficient aeration to assure the development and operation of this organism.

It is then noted—and this is quite characteristic—that there does not form any ethyl alcohol in any appreciable quantity, which quantity, in any event, remains less than 2% of the amount of sugar, nor any organic acids, so that the total weight of 2,3-butanediol and of 3-hydroxy-2-butanone exceeds 40% of the weight of the sugar used.

I have noted in accordance with my invention that it is possible substantially entirely to avoid the formation of 3-hydroxy-2-butanone during the 2,3-butanediol fermentation because there is established an equilibrium between the proportions of these two products. This equilibrium mainly depends on the method and on the intensity of aeration.

By causing the fermentation conditions to vary, there will therefore be obtained with the same organism a mixture of 2,3-butanediol and 3-hydroxy-2-butanone in extremely variable proportions, it even being possible for one or the other of these products to be obtained in a predominant quantity.

When it is a question of obtaining 2,3-butanediol, I have found that if there is introduced at the beginning some 3-hydroxy-2-butanone in the wort to be fermented, the said 3-hydroxy-2-butanone, on account of the equilibrium mentioned above, becomes entirely transformed into 2,3-butanediol under the action of the Mesentericus, in the presence of sugar acting as reducer. In view of the fact that, as a result of its volatility, the 3-hydroxy-2-butanone formed during fermentation distills during the subsequent concentration of the worts, a characteristic feature of the invention consists in again using these condensation waters during the preparation of a new quantity of wort, in order to avoid, in connection with the next fermentation, the formation of further quantities of 3-hydroxy-2-butanone, so that the weight of 2,3-butanediol formed exceeds 40% of the weight of the sugar used. This further use of the condensation waters makes it possible at the same time to recover the 2,3-butanediol carried along during the concentration, which eliminates the application of the special measures which are necessary in the other processes to avoid this carrying along of 2,3-butanediol.

When, on the other hand, it is a question of obtaining 3-hydroxy-2-butanone, it is necessary to increase the aeration of the wort, as will be shown by examples. By controlling the intensity of aeration which may be done by controlling the quantity of air supplied in a given period, a preponderance of 2,3-butanediol or 3-hydroxy-2-butanone may be obtained.

The other advantages of the application of bacteria of the Mesentericus kind are the following:

Their requirements in nutritive elements are assured by a simple addition of an agent supplying phosphorus and nitrogen, for instance, phosphate and ammonium salts to the molasses. As they do not form any acid, it is not necessary to regulate the pH during the fermentation.

The fermented wort is easy to clarify for subsequent treatments; it suffices to bring it to a suitable pH with or without the addition of a defecating agent and possibly to heat so that the bacterial bodies and the other impurities take the form of flocculations which can be separated by the customary mechanical means.

By nature, the Mesentericus bacteria are very resistant to the invasion by other undesirable organisms, and the permanent aeration to which the wort is subjected hampers the development of most of these organisms, so that the execution of the fermentation work is very safe.

The Mesentericus bacteria develop easily in the media having a comparatively high osmotic pressure, which makes it possible to utilize solutions which are rich in sugar, even if they furthermore contain a high proportion of saline impurities, as is the case especially with molasses. The possibility of utilizing, as raw materials, molasses, the cost of which is considerably less than that of grain, has a tremendous advantage as compared with the other processes.

The isolation of suitable organisms is very easy due to their extreme diffusion in nature and to the high thermal resistance of their spores. For instance, they are found in garden soil and especially on the skin of certain tubers. This isolation is effected according to the classical methods heretofore published in the literature after which the more productive species are selected through surface cultures of molasses solutions containing 10% sucrose.

On account of the lack of formation of ethyl alcohol, the recovery of this product which, in the other fermentation processes is carried along with the gases, becomes unnecessary.

The 2,3-butanediol produced by Mesenteric bacilli is the optically active levorotatory isomer having antifreeze properties.

2,3-butanediol may be separated by evaporation of the fermented wort and distillation of the residue, possibly under reduced pressure or by carrying over with steam.

It may also be extracted by means of a suitably selected solvent, for example, butyl alcohol, methylethyl ketone, or methyl-tetrahydrofurane, either starting from the fermentation worts or after prior partial concentration of these worts. In such cases, the fertilizing elements which exist in this wort and which would be more or less destroyed by a high temperature, are saved.

The following examples, which are not limitative, will show how the invention can be advantageously carried out.

Examples

1. There is prepared a leavening agent containing 100 kgs. of beet molasses, 1.5 kgs. of diammonium phosphate, 1 kg. of an anti-foam agent, for example, tannery degras, and 900 liters of water. Then check up the pH which must be between 5.5 and 7.5. Add ammonia if too acid; add phosphoric acid if too alkaline. Heat the solution for 45 minutes to 120° C., cool it to 75° C. and then sow it with a laboratory culture of Mesentericus on a potato aged for at least 8 days and containing spores. Cool immediately to 38–40° C. and maintain at this temperature while injecting air at the base of the vat, at the rate of 35 cu. meters/hr. After 10 hours, the specific gravity of the wort which initially was 1.035 at 15° C., starts to drop; when it reaches 1.025, namely, 19 hours after sowing, this leaven is transferred into a solution previously sterilized for 30 minutes at 110° C. and then cooled to 39° C., and contains 1,500 kgs. of beet molasses, 8.5 kgs. of diammonium phosphate and 3 kgs. of antifoaming agent, sufficient water being added to make a volume of 9,100 liters. While maintaining the temperature at about 38–40° C., aerate immediately through the bottom of the vat at the rate of 150 cu. meters/hr. 21 hours after transferring the leaven, the specific gravity of the wort has dropped to 1.0310. At that time, the aeration is reduced to 60 cu. meters/hr. to avoid too large a formation of 3-hydroxy-2-butanone. 12 hours later, the specific gravity of the wort being 1.0245, reduce again the aeration down to 22 cu. meters/hr. and maintain same at this rate for 2 to 3 hours, during which the specific gravity drops slightly further, then becomes constant and equal to 1.024. This constancy of the density shows that the transformation of the sugar is completed, which also becomes evident through a rapid increase of the 3-hydroxy-2-butanone content which passes from 4.75 grams per liter to 6.2 during the last period. The wort contains 257 kgs. of 2,3-butanediol and 60 kgs. of 3-hydroxy-2-butanone which may be tested according to the Kniphost and Kruisher method (Zeitschrift für Untersuchung der Lebensmittel—January 1937, p. 1–19) or any other specific method.

The total yield in the above-mentioned products is 40.4% of the weight of the sugar. These products may be separated from the fermented wort by evaporation, followed by a distillation or by carrying along with steam or by extraction by means of solvents. If 90% of the water is evaporated, the water carries along 56 kgs. of 3-hydroxy-2-butanone which can be recovered in the form of a diluted solution by condensation of the steam, together with 17 kgs. of 2,3-butanediol.

It is advisable to clarify the wort, especially if it is desired to effect an extraction through a solvent. For this purpose, there are added to the wort above produced 100 liters of a strong mineral acid such as, for instance, hydrochloric acid at 22° Bé.; then the heat is increased to 50° C. and the precipitate is separated by filtration, natural or centrifugal decantation or any other known means.

2. The preparation of the leavening agent and that of the main wort is effected in the same manner as in Example 1 but instead of water, there are used for the dilution of the molasses, all the condensation waters obtained during the concentration from a previous operation and containing, for example, 17 kgs. of 2,3-butanediol and 56 kgs. of 3-hydroxy-2-butanone.

The fermentation of the main wort is carried out in the same manner up to 11 hours counted from the time of the transfer of the leavening agent. At that time, the aeration is progressively reduced according to the following table:

| Age starting from the transfer of the leaven | Aeration in cu. meters per hr. | Specific gravity of the wort at 15° C. |
|---|---|---|
| Hours | | |
| 0 | 150 | 1,053 |
| 11 | 110 | 1,043 |
| 21 | 60 | 1,033 |
| 31 | | 1,028 |
| 41 | 20 | [1] 1,025 |

[1] Constant.

The 3-hydroxy-2-butanone content per liter of wort which was initially 5.7 grams per liter, has passed to 4.30 after 11 hours and then to 5.2 after 31 hours, and finally, 6.5 after 41 hours.

The fermented wort contains 332 kgs. of 2,3-butanediol and 63 kgs. of 3-hydroxy-2-butanone. If the products introduced before fermentation are deducted, the yields for 100 kgs. of sugar placed in fermentation are 40.2% for the 2,3-butanediol and 0.9% for the 3-hydroxy-2-butanone, respectively.

3. 10,000 liters of an aqueous solution containing 1,100 kgs. of beet molasses, 1.5 kgs. of diammonium phosphate and 5 kgs. of anti-foam agent, for example, fish oil, are sterilized for 30 minutes at 120° C. and then sown, after cooling to 39° C., by means of 0.5 liter of a laboratory culture of Mesentericus obtained on the surface of a molasses solution, containing 6.5% sucrose. Then aerate at the rate of 150 cu. meters/hr. After 45 hours, the specific gravity becomes constant and equal to 1.015 at 15° C. The wort contains 133 kgs. of 3-hydroxy-2-butanone and 70.3 kgs. of 2,3-butanediol, namely a total for both the butanolone and butanediol of 43% of the weight of the molasses sugar.

Diammonium phosphate may be substituted in the above examples by the following: sodium of potassium phosphate, in combination with ammonium chloride, sulphate, nitrate, etc.

What I claim is:

1. A process for making 2,3-butanediol which comprises, combining 3-hydroxy-2-butanone with an aqueous sugar-containing solution and fermenting the same with a Mesentericus organism selected from the group consisting of *Mesentericus vulgatus*, *Mesentericus ruber* and *Mesentericus fuscus* while passing an air current of the order of about 1.5 cubic meters of air per hectoliter of solution per hour therethrough, to cause production of a greater quantity of 2,3-butanediol than formed if such 3-hydroxy-2-butanone had not been combined with said solution.

2. A process for making 2,3-butanediol which comprises, combining 3-hydroxy-2-butanone with an aqueous sugar-containing solution and fermenting the same with a Mesentericus organism selected from the group consisting of *Mesentericus vulgatus*, *Mesentericus ruber* and *Mesentericus fuscus* while passing an air current of the order of about 1.5 cubic meters of air per hectoliter of solution per hour, to cause production of a greater quantity of 2,3-butanediol than formed if such 3-hydroxy-2-butanone had not been combined with said solution.

3. A process for making 2,3-butanediol which comprises, combining 3-hydroxy-2-butanone with an aqueous sugar-containing solution, fermenting the same with a Mesentericus organism selected from the group consisting of *Mesentericus vulgatus*, *Mesentericus ruber* and *Mesentericus fuscus* while passing an air current of the order of about 1.5 cubic meters of air per hectoliter of solution per hour therethrough, to cause production of a greater quantity of 2,3-butanediol than formed if such 3-hydroxy-2-butanone had not been combined with said solution, and continuing the passage of air therethrough until a substantially constant density of solution is obtained.

4. A process for making 2,3-butanediol which comprises, combining 3-hydroxy-2-butanone with an aqueous sugar-containing solution and fermenting the same with a Mesentericus organism selected from the group consisting of *Mesentericus vulgatus*, *Mesentericus ruber* and *Mesentericus fuscus* while aerating the solution in stages of decreasing intensity, the average of which is less than 1.5 cubic meters of air per hectoliter of solution per hour, to cause production of a greater quantity of 2,3-butanediol than formed if such 3-hydroxy-2-butanone had not been combined with said solution.

5. A process for making 2,3-butanediol which comprises, combining 3-hydroxy-2-butanone with an aqueous sugar-containing solution, fermenting the same with a Mesentericus organism selected from the group consisting of *Mesentericus vulgatus*, *Mesentericus ruber* and *Mesentericus fuscus* while aerating the solution in several stages in which no stage is of an intensity greater than 1.5 cubic meters of air per hectoliter of solution per hour, to cause production of a greater quantity of 2,3-butanediol than formed if such 3-hydroxy-2-butanone had not been combined with said solution.

6. A process for making 2,3-butanediol and 3-hydroxy-2-butanone which comprises, fermenting an aqueous sugar-containing solution with a Mesentericus organism selected from the group consisting of *Mesentericus vulgatus*, *Mesentericus ruber* and *Mesentericus fuscus* while passing an air current therethrough at a rate not to exceed about 1.5 cubic meters of air per hectoliter of solution per hour to produce a mixture of 2,3-butanediol and 3-hydroxy-2-butanone.

7. A process which comprises preparing an aqueous sugar-containing solution and a Mesentericus organism selected from the group consisting of *Mesentericus vulgatus*, *Mesentericus ruber* and *Mesentericus fuscus* capable of producing on fermentation an equilibrium of 2,3-butanediol and 3-hydroxy-2-butanone, adding 3-hydroxy-2-butanone in an amount in excess of that in such equilibrium to increase the production of 2,3-butanediol while lowering the production of 3-hydroxy-2-butanone, and fermenting the solution containing said excess while passing an air current of the order of about 1.5 cubic meters of air per hectoliter of solution per hour therethrough, thereby increasing the production of 2,3-butanediol in proportion to the 3-hydroxy-2-butanone.

PAUL VERGNAUD.

REFERENCES CITED

The following references are of record in the file of this patent:

UNITED STATES PATENTS

| Number | Name | Date |
|---|---|---|
| 1,899,098 | Kluyver et al. | Feb. 28, 1933 |
| 2,023,087 | McCutchan et al. | Dec. 3, 1935 |
| 2,344,025 | Christensen | Mar. 14, 1944 |
| 2,401,776 | Sjolander et al. | June 11, 1946 |

OTHER REFERENCES

Biochem. J. V. 36 (1942), pp. 575–581 by Stahly et al.

Bergeys' Manual of Determinative Bacteriology, 6th ed. (1948), page 709.

Chemical Abstracts, vol. 31, page 2631[3] (1937), citing Tomiyasu, J. Agri. Chem. Soc. Japan, 12, 1020–3 (1936).